United States Patent [19]
Simon

[11] 3,912,167
[45] Oct. 14, 1975

[54] AUTOMATICALLY OPERATED WATER DISTRIBUTION SYSTEMS SUCH AS LAWN AND GARDEN SPRINKLING SYSTEMS AND TIMER OPERATED VALVE THEREFOR

[76] Inventor: Donald R. Simon, R.F.D. No. 1 Townline Road, Mokena, Ill. 60448

[22] Filed: Jan. 7, 1974

[21] Appl. No.: 431,155

[52] U.S. Cl. .................................. 239/66; 239/70
[51] Int. Cl.² ........................................ A01G 25/16
[58] Field of Search ............................ 239/66–70, 239/207, 267; 222/70; 137/624.2, 624.21, 137/624.22

[56] References Cited
UNITED STATES PATENTS

| | | | |
|---|---|---|---|
| 1,812,586 | 6/1931 | Elder | 239/68 X |
| 2,267,492 | 12/1941 | Burroughs | 137/139 |
| 3,108,609 | 10/1963 | Schroder | 239/66 X |
| 3,144,038 | 8/1964 | Stilwell | 239/66 X |
| 3,529,618 | 9/1970 | Rinkewich | 239/68 X |

*Primary Examiner*—John J. Love
*Attorney, Agent, or Firm*—Wolfe, Hubbard, Leydig, Voit & Osann, Ltd.

[57] ABSTRACT

A timer actuated valve for use in an automatic garden or lawn sprinkling system. In a preferred system a plurality of such valves are connected to a source of water under pressure in a series arrangement. Each valve includes a manually settable timer for selecting the discharge period of its associated valve, and a water flow operated release means for initiating the cycle of the timer. Setting the timer serves to connect the valve inlet to a discharge outlet and to block a bypass outlet. When the water supply to the system is turned on, water flows through the discharge of the first valve in the series and initiates the cycle of its timer. At the end of the set time period, the timer causes the valve to block the discharge and open the bypass thereby supplying water to the second valve in the series. Each valve in the series cycles in this manner for a period determined by the setting of its associated timer. The last valve in the series may have its bypass outlet capped thereby providing for automatic termination of the watering cycle.

4 Claims, 2 Drawing Figures

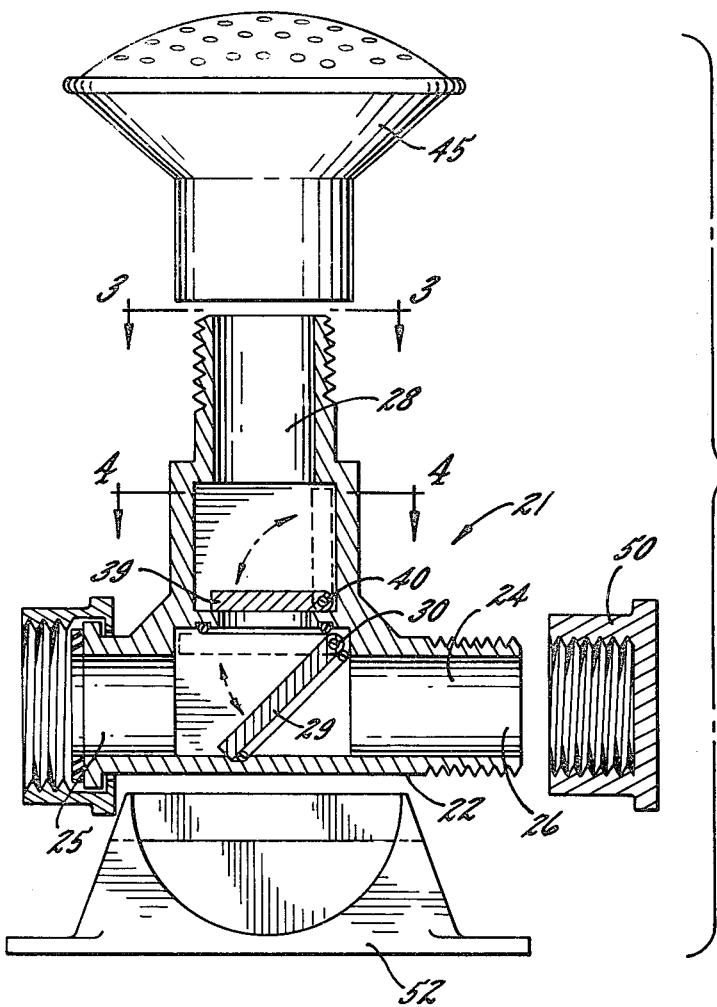
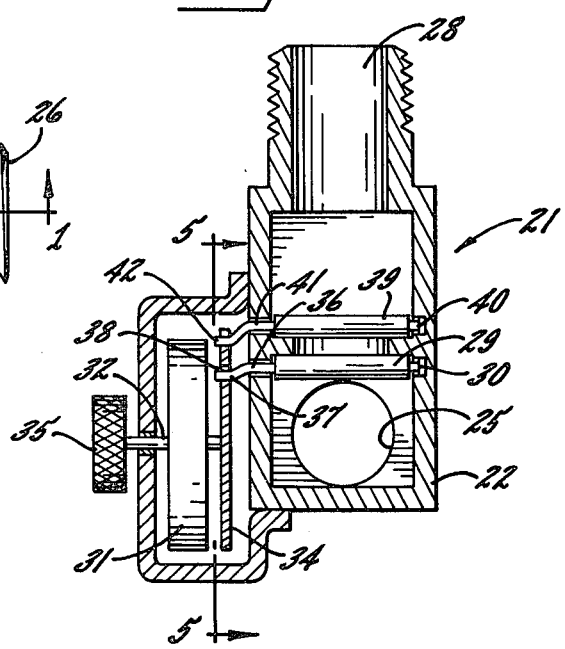
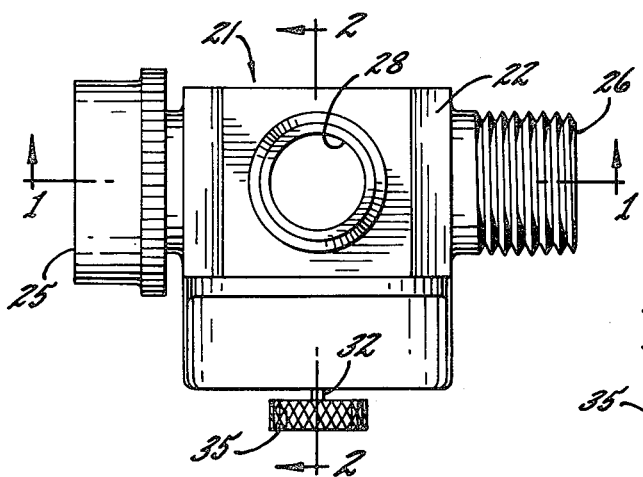

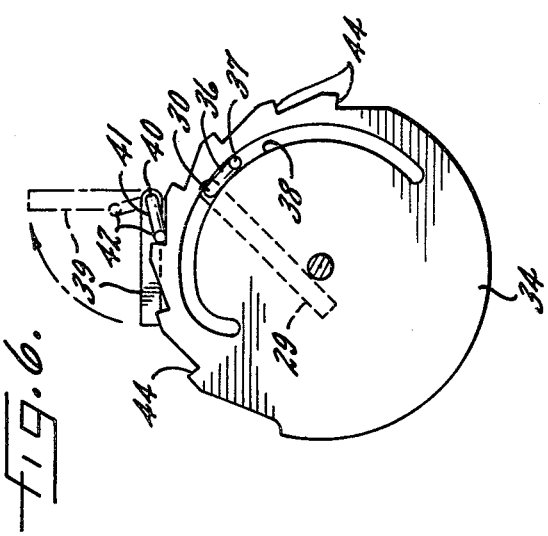
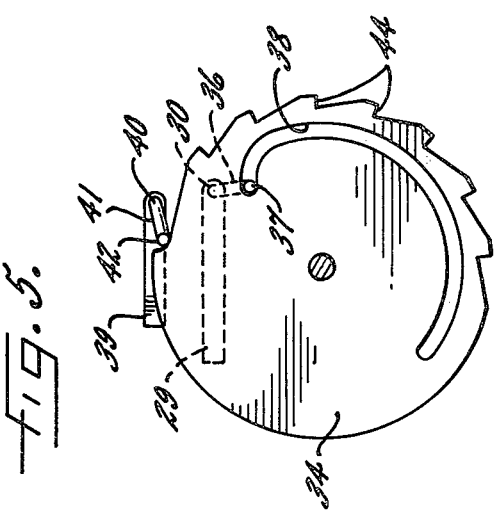
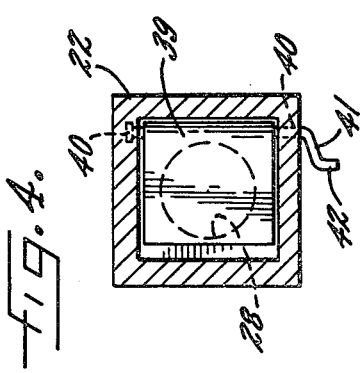
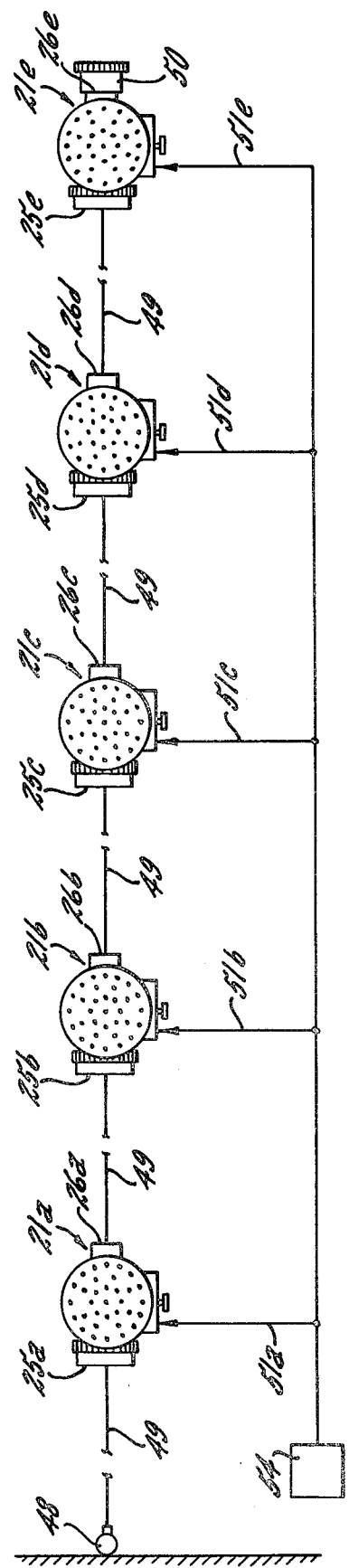

AUTOMATICALLY OPERATED WATER DISTRIBUTION SYSTEMS SUCH AS LAWN AND GARDEN SPRINKLING SYSTEMS AND TIMER OPERATED VALVE THEREFOR

This invention generally relates to timer operated valve mechanisms, and more particularly to those adaptable for use in automatic sprinkling systems.

While the prior art includes various programmable or automatic sprinkler systems, the complexity and resultant cost of such systems have generally precluded their use by the average gardener or home owner. Very often, such systems must be buried in the ground thereby limiting their flexibility. Additional flexibility, which may be achieved by additional sophistication in the control system, is available, but at additional expense.

The average homer owner or gardener, therefore, is left to purchase one of the available types of sprinkler heads or traveling sprinklers, physically position it or set up the path to be followed, and actively initiate, time and terminate the watering period for each section of his lawn or garden. In addition to requiring his constant attention, such a system very often results in wasted water and over-soaked areas.

With the foregoing in mind, it is an object of the present invention to provide a valve for use in an automatic sprinkler system which has a different operating mode than valves heretofore known, in which the valve automatically operates to initiate and terminate a timed watering cycle. More particularly, it is an object to provide such a valve which may be preset to supply water to a sprinkler head or the like for a selected period and which interrupts such supply at the termination of the period.

It is a more detailed object to provide a timer actuated valve for use in an automatic sprinkler system wherein a timer may be preset for a selected discharge period at convenience, the discharge period being initiated by the supply to the valve of water under pressure and terminated by the action of the timer.

It is a further object to provide an automatic sprinkler system using a plurality of such valves arranged in series, each having a timer for controlling the length of its discharge cycle, and each arranged to have its discharge cycle initiated by the termination of the cycle of the previous valve in the series.

Thus, it is a general aim to provide a sprinkler system which requires no supervision once set up and supplied with water from a source.

Other objects and advantages will become apparent from the following detailed description when taken in conjunction with the accompanying drawings in which:

FIG. 1 is a sectional front view of a valve illustrating the invention taken generally along the line 1—1 of FIG. 3 and additionally showing an end cap and a sprinkler head;

FIG. 2 is a sectional side view of the valve taken generally along the line 2—2 of FIG. 3;

FIG. 3 is a top view of the valve taken generally along the line 3—3 of FIG. 1;

FIG. 4 is a partial sectional view taken generally along the line 4—4 of FIG. 1 and illustrating the pivotable flap;

FIG. 5 is a view of the timer cam in the "timed out" position taken generally along the lines 5—5 of FIG. 2;

FIG. 6 is a similar view showing the cam in a "set" position; and

FIG. 7 is a diagram illustrating an automatic sprinkler system using a series connected arrangement of timer actuated valves, and further illustrating an electrical control therefor.

While the invention will be described in connection with a preferred embodiment, it will be understood that there is no intent to limit it to that embodiment. On the contrary, the intent is to cover all alternatives, modifications and equivalents as may be included within the spirit and scope of the invention as defined by the appended claims.

In accordance with the present invention, a water distribution system is provided, herein shown as a lawn sprinkling system in FIG. 7. The system incorporates a number of like, timer operated, valves 21a-e connected in series as by means of separate hose sections, each valve being operable automatically and in succession starting with the first valve 21a in the series, to initiate and terminate its own discharge cycle, and being the only valve discharging during that cycle receiving the full water pressure available from the supply, and after termination of its own cycle causing the water to be supplied to the next valve in the series.

While it is contemplated and recognized that timer operated valves with a variety of internal configurations can be utilized in this system, a preferred form of timer operated valve suitable for such use is diagrammatically shown in FIGS. 1-3. The valve includes a housing or body 22 which defines a bypass passage 24 having an inlet 25 and an outlet 26. Diverging from the bypass passage is a discharge passage 28. A pivotable valve member or bypass valve 29 is secured to a pivot pin 30, the projecting ends of the pin being rotatably mounted in the valve body. This arrangement allows the valve member 29 to assume two positions as is illustrated in FIG. 1. In a first position, shown in solid lines, the valve closes the bypass passage 24 and connects the inlet 25 with the discharge outlet 28. In a second position, shown in dashed lines, the discharge passage is closed while the bypass is opened, connecting the inlet 25 to the outlet 26.

In carrying out the invention, to position the valve member 29, a timing mechanism is provided. Referring to FIG. 2, a conventional spring operated timer 31 has a shaft 32 coupled to a timer cam 34. Also mounted on the shaft 32 is a setting knob 35 which is made accessible to the user. If desired, the setting knob 35 may be provided with an arrow or pointer (not shown) and with an associated scale, graduated in units of time, provided on the valve body. As shown in FIGS. 2, 5 and 6 an extension of the pivot pin 30 is shaped to provide a crank arm 36 having a projection 37 which fits into a cam slot 38 in the timer cam 34. It is seen, therefore, that the angular position of the timer cam controls the position of the valve member 29. FIG. 5 illustrates the "timed out" position wherein clockwise rotation of the timer cam has rotated the crank arm 36 in a clockwise direction thereby raising the valve member 29 to its upper position (shown in dashed lines in FIG. 1) and opening the bypass passage. FIG. 6 illustrates the result of manual counterclockwise rotation of the timer which causes counterclockwise rotation of the crank arm 36 thereby forcing the valve member 29 into its lowered position closing the bypass and opening the discharge passage.

Further in keeping with the invention, means responsive to water flowing through the discharge passage is provided for releasing the timer, herein shown as a pivotable flap 39 located in the discharge passage and supported by a pivot pin 40, and the end of the pivot pin being formed (FIG. 2) to provide a second crank arm 41 and an extension or detent member 42 engageable with the timer cam 34. Referring to FIGS. 1, 5 and 6, the flap 39 is shown to have two operative positions. In the lower position, as shown in the solid lines, the detent member 42 has dropped between and interferes with the teeth 44 of the timer cam 34. It should be appreciated that such interference will prevent clockwise rotation of the timer cam. When the flap 39 is in its upper position as shown in dashed lines in FIGS. 1 and 6, the pin is disengaged from the timer cam teeth thereby allowing the timer cam to rotate in the clockwise direction under the spring force of the timer.

The flap 39 is arranged to normally assume its lower (or solid line) position, being urged into this position by the weight of the flap which may be augmented, if desired, by a light spring.

Accordingly, turning again to FIG. 7, an automatic sprinkling system may be provided by connecting a plurality of such valves 21 in series. Such a system may be readied for operation at the user's convenience. Operation may be remotely initiated simply by turning on the outside faucet or valve 48 which supplies water from, illustratively, a household water supply to the system; the cycle is automatically terminated after each of the series of valves completes its cycle in succession. With such a system the length of the watering or discharge period for each valve 21 is set by rotating the individual timer mechanisms through the control knobs 35 in a counterclockwise direction from the position shown in FIG. 5 to, illustratively, a set position as shown in FIG. 6. Although the flap 39 is in its down position, counterclockwise rotation of the timer cam 34 allows the detent 42 of the crank arm 41 to ride along the top of teeth 44 and to hold the timer in its set position when counterclockwise rotation is completed. Additionally, the counterclockwise rotation of the cam 34 moves the valve member 29 from its up position as shown in FIG. 5 to its lowered position as shown in FIG. 6. As described previously, this closes the bypass passage and connects the inlet to the discharge outlet.

Each valve may be left in the above described position until it is desired to initiate the watering cycle. Such cycle is remotely initiated by supplying water to the inlet 25a of the first valve 21a in the series by opening the faucet 48, causing the flap 39 of the first valve 21a to be raised and, allowing water to flow from the inlet through the discharge outlet 28a. The water may be dispersed by a sprinkler head such as that illustrated at 45 in FIG. 1. The flow of water to the sprinkler head, in raising the flap 39 releases the timer and initiates the timing period by removing the detent 42 from the tooth 44 of the timing cam 34. This allows the timing cam to rotate clockwise at a known rate under the control of the timer 31. Such action continues until the timer cam reaches the position illustrated in FIG. 5, at which time the valve member 29 is raised, closing off the discharge passage and terminating the watering cycle for the first valve 21a. This action, however, opens the bypass passage which allows water flow through the next section of conduit 49 to the second valve 21b in the series and automatically initiates the watering cycle at that second series connected valve.

Each succeeding valve, having its inlet connection 25 coupled to the bypass outlet connection 26 of the previous valve in the series is cycled in a similar manner. The final valve in the series, valve 21e, has its outlet connection 26e closed by a cap or closure 50. When valve 21e terminates its discharge period, causing its valve 29 to connect its inlet 25e to its bypass outlet 26e, water flow ceases thereby terminating the watering cycle. The water supply may then be turned off by the user at his convenience.

Summarizing the operation of such a system, the user, at his convenience, sets the timing period for each of the valves 21a-21e. It should be appreciated that the discharge period of each of the valves may be independently set by its associated timer. The watering cycle may be remotely initiated when desired, in the illustrated embodiment by turning on the water supply at valve 48. Each of the series connected valves then cycles through its timed discharge period in succession. The cycling of the last valve in the series causes the water flow to cease, thereby terminating the watering cycle. The user may then, at his convenience, turn valve 48 off.

It should be noted that the spring of the timer should be arranged so as to produce sufficient force acting on the bypass valve to raise it from its closed to its open position as the timer cam winds down to its zero position as shown in FIG. 5. Also of note is that, in the foregoing description, water pressure against the bypass valve has been relied on to hold the valve in its closed position (i.e. during a discharge cycle). In certain instances it may be desirable to augment the water force with a spring or tensioning device. It should also be appreciated that if the user desires to prevent one or more of the valves in a series from operating during a watering cycle, he may set such valves to their zero position. This serves to automatically bypass any valves so set, allowing the succeeding non-zero set valve in the series to be activated in its sequence.

While I have shown a manually operable spring operated timer, it is contemplated that the timer could be electrically powered and remotely controlled via signal cable in an underground installation. Such a system is diagrammatically illustrated in FIG. 7 wherein a control box 54 is connected via signal cables 51a-51e to the respective timer mechanisms, which in this case are electrically settable. In such a system the user would, acting through the control box 54, set each of the timers via signal cables 51a-51e to their preselected timing periods. As described above, initiating the supply of water through the valve 48 would then initiate the watering sequence.

While only a single form of sprinkler head has been illustrated, it is contemplated that various sprinkling devices may be used in conjunction with the timer actuated valve. To this end, a standard pipe tap is provided at the discharge connection. A sprinkler may be mounted directly thereon as shown in FIG. 1. Alternatively, a hose or other available sprinkling device may be connected to the discharge port. In certain circumstances it may be desirable to connect a series of remote sprinkler heads to a single timer actuated valve.

Taking the example of an underground system, a series of timer actuated valves may be arranged in series with the valves installed on their sides such that the discharge ports project horizontally just below the surface of the ground and perpendicularly with respect to the series string. A spaced series of sprinkler heads may then be connected to the discharge port of each valve, providing a grid type watering system wherein each line of the grid is cycled in succession.

The connections between the water supply, the timer actuated valves, and any remote sprinkler heads may be made by hose, pipe, or other suitable form of tubing. The term conduit is used herein, in a generic sense, to encompass any such means of connection suitable for a given installation.

When used in a surface standing system the valve may be mounted on a base 52 (FIG. 1) to support it on the grass. Such base may be integrally formed with the housing or a removable accessory as illustrated in FIG. 1.

I claim as my invention:

1. An automatic sprinkler system adapted to be connected via a control valve to a source of water under pressure, comprising in combination
 a plurality of valves,
 each valve having
  an inlet
  a bypass outlet
  a discharge outlet
  passages connecting said inlet to both said outlets,
 valve means in said passages for connecting the inlet to the discharge outlet in a first position and for connecting the inlet to the bypass outlet in a second position,
 a timer having a cam for controlling the position of said valve means, the timers of said valves being independently settable to establish selected discharge periods for each of said valves, setting of each timer serving to place the associated valve means in its first position,
 means engaging said cam for holding the timer in its set position,
 means responsive to a flow of water through the discharge outlet for disengaging said cam and releasing said timer thereby initiating the discharge period for the associated valve,
 the timer being operable to rotate the cam to switch said valve means to its second position at the termination of said discharge period,
 the valves being arranged at spaced locations in an area to be watered and series connected with the first valve having its inlet connected via the control valve to the source of water and each succeeding valve having its inlet connected to the bypass outlet of the preceding valve in the series,
 the setting of the individual timers for selected discharge periods providing for a watering cycle initiated by turning on the control valve and in which each succeeding valve in the series is operated successively, the termination of the discharge period of each valve serving to initiate the discharge period of the succeeding valve in the series.

2. The automatic sprinkling system as set forth in claim 1 further including a closure for the bypass outlet of the last valve in the series whereby the watering cycle is automatically completed upon the termination of the discharge period of said last valve.

3. The automatic sprinkling system as set forth in claim 2 wherein individual valves in the series may be set for a zero discharge period, placing said valve means in said second position and serving to bypass the valve so set and initiate the discharge period of the next succeeding non-zero set valve.

4. The automatic sprinkler system as set forth in claim 2 further including distribution means coupled to the discharge outlet of each valve for dispersing the water flowing through the discharge outlet to the area to be watered.

* * * * *